United States Patent [19]

Heilemann

[11] 4,000,851
[45] Jan. 4, 1977

[54] SOLAR-HEATED DWELLING

[76] Inventor: Volkmar Heilemann, 127 Mountain View Road, Warren Township, N.J. 07060

[22] Filed: Nov. 12, 1975

[21] Appl. No.: 631,085

[52] U.S. Cl. .................... 237/1 A; 126/271; 126/400; 165/18; 165/45
[51] Int. Cl.² ......................................... F24J 3/02
[58] Field of Search .................. 126/270, 271, 400; 237/1 A; 165/45, 18; 62/437, 260

[56] References Cited

UNITED STATES PATENTS

| | | | |
|---|---|---|---|
| 2,559,870 | 7/1951 | Gay | 237/1 A X |
| 2,680,565 | 6/1954 | Lof | 237/1 A |
| 2,693,939 | 11/1954 | Marchant et al. | 165/45 X |
| 3,262,493 | 7/1966 | Hervey | 165/18 X |
| 3,369,541 | 2/1968 | Thomason | 126/271 |
| 3,873,022 | 3/1975 | Hilgemann | 237/8 R |

*Primary Examiner*—William E. Wayner
*Assistant Examiner*—William E. Tapolcai, Jr.

[57] ABSTRACT

In a preferred embodiment of the invention, rotatably adjustable elongated cylindrical solar collector plate cells, rotatable around the elongated axis thereof for adjusting angle of incidence of exterior light rays from the sun to the surface of the collector plate, are mounted upon a roof with water flow therefrom being channelled below an insulated ceiling downwardly for alternate flow as between parallel flow paths alternately selectively to and through concrete slab conduits having copper tubing directing heated water therethrough, and the parallel flow conduits through a layer of rocks beneath the concrete slab, the concrete slab being a part of the floor structure of the dwelling and the layer of rocks being a reservoir sink therebeneath, flow being directed dependent upon differential temperature of the upper floor surface of the concrete slab, such that space within supporting wall room space defined between the ceiling and the floor is economically heated devoid of excessive room temperatures and with substantially level and constant ambient temperature ranges as desired and preset within the room space over extended periods of time for and throughout a heating season of the year, while being inoperative and non-functional when heat is not desired, and including further a hot-water heating provision embodied within an intermediate heat exchanger located between the solar cells fluid circuit and the concrete slab heating circuit, each circuit having its individual circulation pump controlled by its respective thermostat.

10 Claims, 5 Drawing Figures

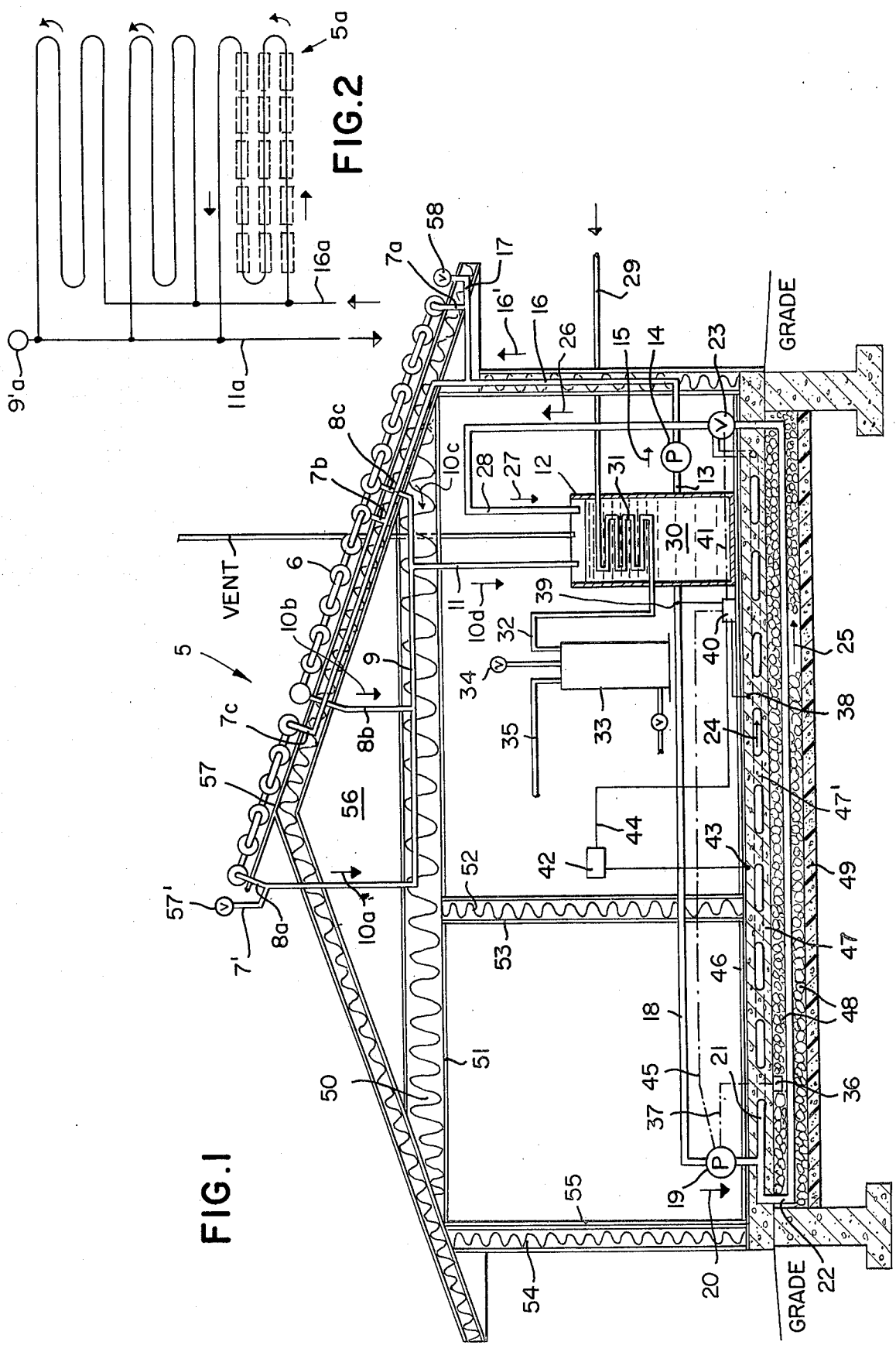

SOLAR-HEATED DWELLING

This invention is directed to a novel solar heating unit for an office or home dwelling, as well as schools and industry.

BACKGROUND TO THE INVENTION

Prior to the present invention, there have been major difficulties and disadvantages associated with the solar homes built thus far built by leading proponents of solar heating. For example there is the electrical energy of the running of pumps of the current systems, which because of inefficient heating by radiators and the like, and because of inadequate provisions for heat reservoirs, and the like, nevertheless involve great expense for the electrical energy consumed by such pumps; moreover, the need for supplemental heating is extensive in most cases because of the inadequate heat reservoirs, as well as because the prior systems are functional only when the water within the reservoir tank is relatively high in temperature, because of the excessive heat loss in the circulating of the water to the radiator or equivalent heating units within the rooms of the dwelling. Additionally, control — rather the lack of control — of heat within a desired temperature range independent of major changes in outdoor daily temperatures, has constituted a major problem, the system tending to overheat beyond need in hot weather, while providing inadequate and/or delayed heat during cool weather. Also, during hot weather of summer, prior solar units have resulted in excessive attic heat, additionally normally requiring an attic fan to evacuate hot air therefrom resulting from over-heated roof structure, which excessive heat also is detrimental to the structure of the dwelling itself. Increased cost of electrical energy, in the light of all of these difficulties, seriously detracts from prior systems, for solar heating.

SUMMARY OF THE INVENTION

Accordingly, objects of the present invention include the overcoming and/or avoiding of disadvantages and disadvantages of the types described above, together with the obtaining of novel advantages and innovations.

Another object is to obtain a solar-heated dwelling in which the intermediate transfer of heat energy is obviated by direct heating of dwelling space by the heat reservoir itself efficiently.

Another object is to obtain an improved heat-sink and reservoir having a high potential heat-sink reserve and durability.

Another object is to obviate prior high electricity demands during heating and summer seasons respectively.

Another object is to obtain improved control of temperature range in the dwelling space being solar heated.

Another object is to obtain improved control over selectivity of immediate heating versus future heating by selective storage capability.

Another object is to obtain an improved solar-heated dwelling conservative of heat energy through improved arrangement of the solar heating elements relative to dwelling structural elements.

Another object is to avoid needless heat loss and to improve exclusion of unwanted heat, respectively, during the alternate winter and summer seasons.

Another object is to avoid structural dwelling roof damage by the improved dwelling structure of this invention.

Other objects become apparent from the preceding and following disclosure.

One or more objects are obtained by the invention as defined herein.

Broadly the invention may be defined as a solar heating unit in the form of a dwelling such as an office or home, of which the building structure includes a particular floor structure and combination, wall structures positioned to define the dwelling space immediately above the floor structure combination; a particular ceiling structure combination, a particular roof structure and combination, together with a solar heating system for harnessing heat energy from the sun light rays and for transferring the heat energy to the particular floor structure combination by forced circulation. In various preferred embodiments, the particular floor combination includes a heat sink-reservoir of rocks below and in conductive contact with a concrete slab floor thereabove having heat flow conduit spaces extending therethrough with typically and preferably copper piping embedded therein for circulation of the fluid to and from the solar cells. Preferably also, there is a parallel flow conduit system to that flowing through the concrete slab, the parallel flow extending as by copper tubing, through the rock layer, with a valve thermostatically controlled by upper surface temperature of the concrete slab, to divert flow to and from the conduits of the concrete slab depending upon the temperature thereof, being diverted to the reservoir whenever the upper surface of the concrete slab exceeds a predetermined temperature as might be desired and preset selectively, until such temperature decreases below another preset selected minimum. The preferred solar cells employed are the same inventor's cylindrical rotatable collector-plate cells intermittently adjustable in angle of incidence from time-to-time through the year, for example, to obtain optimum efficiency by most direct (perpendicular, for example) sun rays, and having the desired and preferred insulation beneath the collector plate, such that the respective cells in fact, while collecting solar heat, simultaneously insulate the roof surface from the heat of the sun as well as from the heat of the collector plate of the cell itself, adding to the efficiency of the cell as well as to the protection of the roof from excessive heat exposure. In a still other preferred embodiment, there is provided an intermediate heat exchanger as a liquid reservoir, for the preferred water heat transfer media, from which reservoir for liquid, there is one pump cycle to and from the solar cells, with a venting valve which when open causes the water to drain to the reservoir, rendering the further collection of solar heat impossible until the vent is again closed and the pump rebegun. The opening and closing of the venting valve and the activation and deactivation of the solar cell cycle pump are controlled by typically and preferably a common thermostat which vents and turns-off the pump whenever the water in the reservoir exceed a selected preset temperature, and turns-on the pump and closes the venting valve when the heat exchanger reservoir water temperature drops below a selected preset minimum temperature. In another pump cycle to and from the conduits of each of the pipes of the concrete floor slab and the layer of rocks therebeneath, flow is controlled by a pump responsive also to the temperature of the uppersurface by a thermostat, such as the differential thermostat controlling the flow selection of the parallel conduit flows of the concrete floor slab and the rock layer therebeneath. In a further embodiment, the heat exchanger water reservoir provides a hot-water heating system for the dwelling by the incorporation of a closed-circuit flow therethrough by which water of a hot water pipe may be heated and fed either directly to a faucet of first to a conventional hot water tank and thereafter conventionally to the spigots and the like.

In systems including antifreeze or equivalent liquids within the water, or an alternate heat transfer media of any known and/or conventional type, the need for a large heat exchanger reservoir tank may be obviated. Also, as noted previously, such heat exchanger reservoir tank is not essential, but is but one preferred embodiment.

The invention may be better understood by making reference to the following figures.

THE FIGURES

FIG. 1 illustrates in a diagrammatic view, an elevation side view with the near side of the house not shown, a preferred embodiment of the solar-heated dwelling of the present invention.

FIG. 2 illustrates a typical flow diagram for having parallel flows through consecutive series-rows of cells, from a common cool inlet pipe and to a common hot heat transfer liquid outlet pipe.

DETAILED DESCRIPTION OF THE INVENTION

Figures 3, 3A, 4:
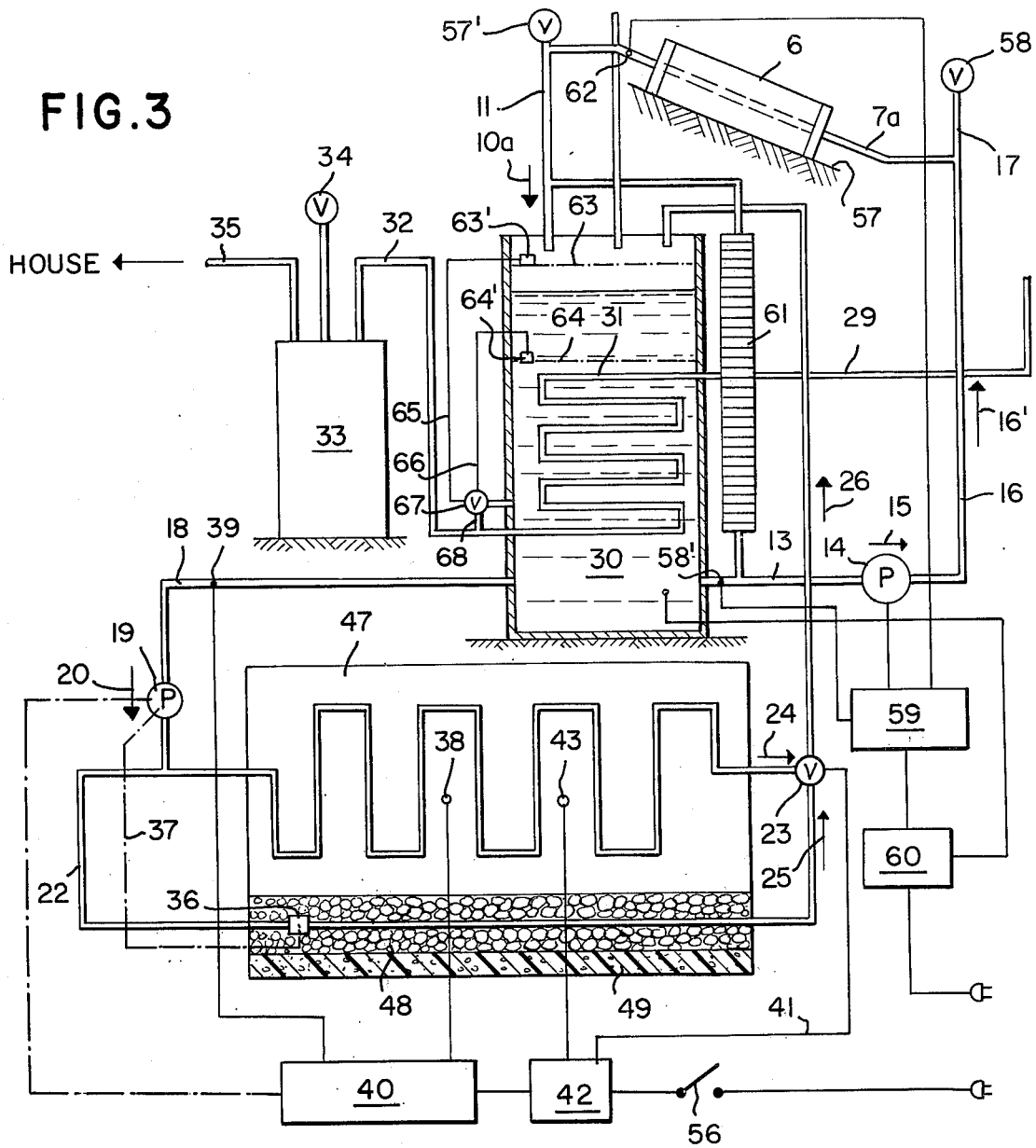
FIG. 3 illustrates a diagrammatic flow and circuitry diagram of a typical embodiment such as typically that of FIG. 1.
FIG. 3A illustrates an in-part view in elevation plan, of a group of preferred solar cells in flow series, where the cells are of the preferred rotatable types rotatable around their elongated longitudinal axes thereof, adapted such that the angle of incidence of sunlight rays is adjustable intermittently.
FIG. 4 illustrates an in-part view of an alternate embodiment to that of FIG. 1, for example, in a diagrammatic side elevation view with the nearest side cutaway, where the lower flow alternate flow is directed through a lower or basement floor.

In greater detail, FIG. 1, FIG. 3 and FIG. 3A represent a common embodiment, and the embodiment of these Figures include the solar cells arranged in a fashion as typified by the arrangement of FIG. 2.

Thus, with regard to this first illustrated common embodiment, a system of solar cells 5 is arranged along a roof 57, with individual cells lying substantially horizontally along the surface of the roof extending lengthwise of the roof, having cell inlet pipes 7a, 7b, 7c and cell outlet pipes 8a, 8b, and 8c collectively channeled through collector pipe 9 and into down-pipe 11 into the reservoir tank 12 having space 30 with hot-water heating coils 31 to be heated thereby to heat cold water entering through source water pipe 29 with an outlet to the hot water heater tank 33 by the outlet pipe 32. From the water within space 30, outlet 13 leads cooler water from the tank to pump 13 delivering water by up-pipe 16 in direction 16' to the safety valve mechanism 17 and to the inlets 7a, 7b, etc. Also from the tank space 30 outlet pipe 18 leads the water to pump 19 in direction 20 through one or both alternate flow-path pipes 21 and 22, the extent of flow through 21 and 22 being controlled by the flip or butterfly valve 23 which is controlled by thermostat 40 as dependent upon the temperature of the concrete slab 47 as sensed by sensor 38 as well as dependent upon the temperature of the water in pipe 18 as sensed by sensor 39. Thermostatic sensor 38 causes the valve 23 to direct all or more flow through pipe 21 when the upper surface of the concrete slab 47 drops below a predetermined set temperature, and causes the valve 23 to direct more or all flow to flow through the pipe 22 after the upper surface temperature at thermostatic sensor 38 exceeds a predetermined value whereby heat becomes stored in the rocks 48 preferably of large gravel size, typically, and the peripheral insulation 49 which typically is urethane foam or the like, prevents any significant heat loss in a downward direction to an exterior of the building structure, as water flows in direction 25 until valve 23 again shifts flow to pipe 21 for again flow in direction 24. The thermostat (differential thermostat) 40 also in part controls the pump 19, turning it on whenever thermostatic sensor 38 senses a predetermined low and also thermostatic sensor 36 turning on the pump whenever the temperature of the rocks 48 is below a predetermined minimum. Pump 19 is off only when both the sensors 38 and 36 are switched to off, whereby the pump remains running when flow is shunted from pipe 21 to pipe 22. Thermostatic sensor 43 is a safety sensor which causes switch 42 to break circuit if and when the temperature of the concrete upper portion exceeds a predetermined dangerous or hazardous temperature, thereby turning-off power to the system and shutting-down the pump 19. Downflow through the down-pipe 11 in direction 10d results in a heating of water in the tank to a predetermined temperature at which the pump 14 shuts-down as controlled by the differential thermostat 59 which responds differentially to the signals from thermostatic sensors 58 and 62, and turns on the flow when that temperature differential, as compared to the temperature of outflow water from the solar cell 6 as typically shown in FIG. 3.

The water tank 33 has the conventional safety vent valve 34 and house-water outlet pipe 35.

Sight-glass 61 permits visual inspection of the water level within the tank 30. Sensors 63' and 64' sense respectively the turn-off water level 63 and the turn-on water level 64 and these sensors jointly control the off-on valve 67 through leads 65 and 66, controlling inlet flow through inlet pipe 68 into the space 30.

While the primary utility of the present invention concerns the concept of the "combination" of low-temperature utilizable water to adequately heat the living spaces of the building by virtue of solar energy supplying only low temperatures during most of the day and/or evening hours, in conjunction with the floor-heating unit thereby eliminating the problem of heretofore system of solar heat units which have relied solely upon conventional radiators, base-board heat and the like, the utility is further enhanced by ceiling heavy insulation and preferably also both outer and inner-walls insulations 50 and 54 and 53, respectively, of the ceiling 51, outer walls 55 and inner walls 53 as typically identified, retaining acquired heat. As noted heretofore-above in the background and objects, because of prior solar heating units most of the time having water in the reservoir tank at too low a temperature to heat the house after heat-loss from pipes during transit to radiators and the like, large amounts of electricity for pumping as well as large supplemental heating by conventional routes has heretofore been necessary, the inefficiency of the prior solar systems thereby making their desirability much less and in fact the heretofore systems being far from adequate and thus less practical and satisfactory, as well as not saving enough in heating costs as to justify the installation of such a system, much less relying on such in the building of a house. In contrast, the present invention has overcome these difficulties, together with other advantages noted herein above.

FIG. 2 illustrates a typical set of cells-layout, with the inlet pipe 16a and the outlet pipe 11a, and the vent 9'a, arrows illustrating the typical directions of water flow.

FIG. 3A illustrates the preferred rotatable solar cells in series, are cylindrical and have substantially transparent tubular walls and are rotatable intermittently around their longitudinal axes in order to best adjust to preferably a perpendicular state the sun rays relative to a flat collector plate, such as of the cells 6a, 6b, and 6c connected for serial water flow therethrough, while the same are supported by brackets 69 on a roof 57a.

FIG. 4 illustrates an alternate embodiment in which basically the lower space 70, beneath upper space 71, is substituted for the FIG. 1 space in which rocks 48 are located, the additionally heated space 70 serving to heat in a supplemental fashion the ceiling 72 and upper insulation 73 and concrete slab 47a and supported floor 48'. The down-pipe 22' is the by-pass pipe as flow is shunted thereinto by the shunt valve 23', to heat lower space floor (concrete slab) 47', typically of a basement, but not necessarily basement space. Floor and walls insulation 74 further retains the heat in this space as a heat reservoir for accessory heating of the above space as already explained.

It is within the scope and spirit of the invention to make such modifications and changes and substitution of equivalents as would be apparent to a person of ordinary skill in this field of engineering.

I claim:

1. A solar heating unit comprising in combination: a building structure having floor means for circulating fluid therethrough and for providing a heat-sink reservoir, and floor means comprising concrete having fluid-flow conduits embedded therein, and rocks in a layer beneath and in contact with a lower face of said concrete in heat-flow relationship adapted such that the rocks serve as a heat sink together with said concrete storing thermal energy over extended periods of time, and the building structure having spaced-apart upright wall structures-means for defining an enclosure inhabitable space therebetween mounted on an upper face of the floor means and supportable of overhead structure, and having ceiling means for providing support for upper structure and for insulating said inhabitable space, mounted on said upright wall structures-means above and capping said space, and roof means for providing shelter to the ceiling means and mounted thereabove on said spaced-apart upright wall structures-means and for providing support for solar cells thereonabove; solar heating means for providing solar cells mounted exterior to said building structure with operative exposure thereof to outdoor sunlight source, and for circulating fluid serially to and through the solar cells, and therefrom to and through said floor means, and from the floor means back to the solar cells, in a substantially closed circulation cyclic flow, adapted such that heat becomes extracted from the fluid into the heat-sink-reservoir and thereby provides thermal heat energy to said inhabitable space for the heating thereof, and for providing forced circulation in said closed circulation cyclic flow.

2. A solar heating unit of claim 1, including reservoir conduit means providing for conduit fluid parallel flow through said layer of rocks, having a differential thermostat and control valve adapted and connected to divert partial or complete flow to the layer whenever temperature of said concrete at an upper surface thereof exceeds a first predetermined temperature until temperature drop thereof to a second predetermined temperature such that heat energy in excess of that temperature selected for the upper surface of the concrete is directly into the heat sink of the layer of rocks for future thermal conductance to the concrete.

3. A solar heating unit of claim 2, in which said solar cells are inclusive of thermal insulation beneath a bottom face of a collector plate adapted such that said roof means is insulated from elevated temperatures resulting from absorbed radiant energy converted to thermal energy by the collector plate.

4. A solar heating unit of claim 3, in which the solar cells are cylindrical rotatable cells having substantially transparent tubular walls, being rotatable around an elongated axis of the cylindrical length thereof adapted such that angle of incidence of sunlight rays is adjustable intermittently.

5. A solar heating unit of claim 4, including peripheral insulation means circumscribingly of an area of location of said layer of rocks for insulating the heat-sink reservoir against heat dissipation to exterior of said building structure.

6. A solar heating unit of claim 5, including heat-exchanger means as a part of said solar heating means, for providing intermediate heat exchange between fluid of one cyclic flow to and from the solar cells and other fluid of another cyclic flow to and from said floor means and said reservoir conduit means, comprising separate first and second cyclic conduits, and an exchanger vessel having both the first and second cyclic conduits flowing to and from the exchanger vessel, and a first thermostat and pump means for opening flow circuit of the first cyclic conduit when fluid temperature within the exchanger vessel reaches a predetermined minimum, the first cyclic conduit channeling flow to the solar cells, and for closing flow circuit of the first cyclic conduit, when temperature within the exchanger vessel reaches a predetermined maximum, the first thermostat and pump means comprising a vent valve and a thermostat connected thereto, with the vent valve and thermostat connected thereto being adapted such that upon venting of the valve, fluid becomes drained into the exchanger vessel such that the flow circuit of the first cyclic conduit is thereby closed.

7. A solar heating unit of claim 6, including a second thermostat and valve means for opening flow circuit of the second cyclic conduit when fluid temperature at said upper surface of the concrete drops below a predetermined minimum temperature, the second cyclic conduit channeling flow to said other cyclic flow, adapted such that thermal energy from the heat exchanger is channeled to the fluid-flow conduits of the concrete whenever temperature is below said predetermined minimum temperature for the concrete.

8. A solar heating unit of claim 7, including a second pump in flow series within said second cyclic conduit and actuatable and deactivatable by said second thermostat and valve means for turning on the second pump when the flow circuit thereof is open and turning off whenever the flow circuit is closed.

9. A solar heating unit of claim 8, wherein said first pump is in flow series within said first cyclic conduit and actuatable and deactivatable by the first thermostat and pump means, adapted such that the first pump is deactivated upon the draining of fluid when venting takes place, and when temperature within the heat exchanger exceeds a predetermined maximum, and activatable when said predetermined minimum temperature within the heat exchanger is reached.

10. A solar heating unit of claim 9, including a closed-flow conduit extending through interior reservoir space of said exchanger vessel, having connection means for connecting thereto hot water pipe inlet and outlet adapted such that water passed through said closed-flow conduit may be heated to hot water.

* * * * *